US 8,956,426 B2

(12) United States Patent
Sethi et al.

(10) Patent No.: US 8,956,426 B2
(45) Date of Patent: *Feb. 17, 2015

(54) METHOD OF DRYING BIOMASS

(75) Inventors: Vijay Sethi, Laramie, WY (US); Clinton B. Camper, Billings, MT (US)

(73) Assignee: River Basin Energy, Inc., Highlands Ranch, CO (US)

( * ) Notice: Subject to any disclaimer, the term of this patent is extended or adjusted under 35 U.S.C. 154(b) by 443 days.

This patent is subject to a terminal disclaimer.

(21) Appl. No.: 13/084,697

(22) Filed: Apr. 12, 2011

(65) Prior Publication Data

US 2012/0023813 A1  Feb. 2, 2012

Related U.S. Application Data

(63) Continuation-in-part of application No. 12/763,355, filed on Apr. 20, 2010, now abandoned.

(51) Int. Cl.
| C10L 5/00 | (2006.01) |
| C10L 5/44 | (2006.01) |
| C10B 49/10 | (2006.01) |
| C10B 53/02 | (2006.01) |
| C10L 9/08 | (2006.01) |

(52) U.S. Cl.
CPC ............... *C10L 5/447* (2013.01); *C10B 49/10* (2013.01); *C10B 53/02* (2013.01); *C10L 9/083* (2013.01); *Y02E 50/10* (2013.01); *Y02E 50/14* (2013.01); *Y02E 50/15* (2013.01); *Y02E 50/30* (2013.01)
USPC ............... 44/605; 44/550; 44/589; 44/591

(58) Field of Classification Search
CPC ............................ Y02E 50/15; C10L 2290/08
USPC ............................................................ 44/605
See application file for complete search history.

(56) References Cited

U.S. PATENT DOCUMENTS

| 1,632,829 A | 6/1927 | Fleissner |
| 1,960,917 A | 5/1934 | Nagelvoort et al. |
| 2,197,792 A | 4/1940 | Erickson |
| 2,204,781 A | 6/1940 | Wattles |
| 2,610,115 A | 9/1952 | Lykken |
| 2,811,427 A | 10/1957 | Lykken |
| 3,047,473 A | 7/1962 | Schmidt |

(Continued)

FOREIGN PATENT DOCUMENTS

| CA | 959783 | 12/1974 |
| DE | 569941 | 2/1933 |

(Continued)

OTHER PUBLICATIONS

International Preliminary Report on Patentability for International (PCT) Patent Application No. PCT/US2010/049957, mailed Apr. 5, 2012 9 pages.

(Continued)

*Primary Examiner* — Ellen McAvoy
*Assistant Examiner* — Ming Cheung Po
(74) *Attorney, Agent, or Firm* — Sheridan Ross P.C.

(57) ABSTRACT

A process for torrefaction of biomass is provided in which biomass are passed into a fluidized bed or a non-fluidized bed reactor and heated to a predetermined temperature in an oxidizing environment. The dried biomass is then fed to a cooler where the temperature of the product is reduced to approximately 100 degrees Fahrenheit.

47 Claims, 5 Drawing Sheets

(56) References Cited

U.S. PATENT DOCUMENTS

| | | | |
|---|---|---|---|
| 3,424,573 A | 1/1969 | Catogio de Villiers |
| 3,687,431 A | 8/1972 | Parks |
| 3,723,079 A | 3/1973 | Seitzer |
| 3,896,557 A | 7/1975 | Seitzer et al. |
| 3,961,914 A | 6/1976 | Kindig et al. |
| 3,971,639 A | 7/1976 | Matthews |
| 3,977,947 A | 8/1976 | Pyle |
| 3,985,516 A | 10/1976 | Johnson et al. |
| 3,985,517 A | 10/1976 | Johnson et al. |
| 3,997,422 A | 12/1976 | Bull et al. |
| 4,043,763 A | 8/1977 | Norman et al. |
| 4,045,187 A | 8/1977 | Brink et al. |
| 4,052,169 A | 10/1977 | Cole et al. |
| 4,071,151 A | 1/1978 | Farber |
| 4,104,035 A | 8/1978 | Cole et al. |
| 4,140,228 A | 2/1979 | Hathaway et al. |
| 4,142,868 A | 3/1979 | Genesoy et al. |
| 4,145,256 A | 3/1979 | Bowen |
| 4,149,228 A | 4/1979 | Adamson, Jr. |
| 4,170,456 A | 10/1979 | Smith |
| 4,192,650 A | 3/1980 | Seitzer |
| 4,203,727 A | 5/1980 | Simpson |
| 4,213,752 A | 7/1980 | Seitzer |
| 4,214,875 A | 7/1980 | Kromrey |
| 4,226,371 A | 10/1980 | Willams |
| 4,244,530 A | 1/1981 | Halvorsen |
| 4,249,909 A | 2/1981 | Comolli |
| 4,282,006 A | 8/1981 | Funk |
| 4,300,291 A | 11/1981 | Heard et al. |
| 4,301,746 A | 11/1981 | Pech et al. |
| 4,308,033 A | 12/1981 | Gunnerman |
| 4,309,192 A | 1/1982 | Kubo et al. |
| 4,314,898 A | 2/1982 | Nakako et al. |
| 4,324,544 A * | 4/1982 | Blake ............................ 432/14 |
| 4,329,929 A | 5/1982 | Jessen |
| 4,341,530 A | 7/1982 | Loth et al. |
| 4,353,427 A | 10/1982 | Stock et al. |
| 4,430,963 A | 2/1984 | Finet |
| 4,444,129 A | 4/1984 | Ladt |
| 4,452,688 A | 6/1984 | Mitchell et al. |
| 4,455,148 A | 6/1984 | Nagata et al. |
| 4,461,624 A | 7/1984 | Wong |
| 4,468,232 A | 8/1984 | Funk |
| 4,470,878 A | 9/1984 | Petrovic et al. |
| 4,486,894 A | 12/1984 | Page et al. |
| 4,495,710 A | 1/1985 | Ottoson |
| 4,497,122 A | 2/1985 | Nelson et al. |
| 4,504,277 A | 3/1985 | Scheffee |
| 4,510,040 A | 4/1985 | Skinner et al. |
| 4,519,995 A | 5/1985 | Schrofelbauer et al. |
| 4,529,407 A | 7/1985 | Johnston et al. |
| 4,547,282 A | 10/1985 | Schindler |
| 4,553,978 A | 11/1985 | Yvan |
| 4,562,748 A | 1/1986 | Mrochek et al. |
| 4,563,196 A | 1/1986 | Seipenbusch |
| 4,571,174 A | 2/1986 | Shelton |
| 4,575,418 A | 3/1986 | Robbins |
| 4,596,650 A | 6/1986 | Schindler et al. |
| 4,606,793 A | 8/1986 | Petrovic et al. |
| 4,617,744 A | 10/1986 | Siddoway et al. |
| 4,787,917 A | 11/1988 | Leclerc de Bussy |
| 4,795,037 A | 1/1989 | Rich, Jr. |
| 4,816,572 A | 3/1989 | Bourgeois |
| 4,852,384 A | 8/1989 | Woolbert et al. |
| 4,954,620 A | 9/1990 | Bourgeois |
| 5,003,891 A | 4/1991 | Kaneko et al. |
| 5,030,054 A | 7/1991 | Reschly et al. |
| 5,033,208 A | 7/1991 | Ohno et al. |
| 5,035,721 A | 7/1991 | Atherton |
| 5,050,310 A | 9/1991 | Jiles |
| 5,054,697 A | 10/1991 | Provost |
| 5,087,269 A | 2/1992 | Cha et al. |
| 5,103,743 A | 4/1992 | Berg |
| 5,145,489 A | 9/1992 | Dunlop |
| 5,156,686 A | 10/1992 | Van Slyke |
| 5,171,474 A | 12/1992 | Tono |
| 5,174,799 A | 12/1992 | Garcia-Mallol |
| 5,197,398 A | 3/1993 | Levy et al. |
| 5,199,185 A | 4/1993 | Davidson |
| 5,213,635 A | 5/1993 | Huang |
| 5,215,596 A | 6/1993 | Van Slyke |
| 5,234,577 A | 8/1993 | Van Slyke |
| 5,265,774 A | 11/1993 | Stone |
| 5,269,947 A | 12/1993 | Baskis |
| 5,322,530 A | 6/1994 | Merriam et al. |
| 5,327,717 A | 7/1994 | Huak |
| 5,360,553 A | 11/1994 | Baskis |
| 5,361,513 A | 11/1994 | Woessner |
| 5,387,267 A | 2/1995 | Warf et al. |
| 5,396,260 A | 3/1995 | Adel et al. |
| 5,411,560 A | 5/1995 | Mainwaring et al. |
| 5,442,919 A | 8/1995 | Wilhelm |
| 5,444,733 A | 8/1995 | Coassin et al. |
| 5,462,932 A | 10/1995 | Brenner et al. |
| 5,471,955 A | 12/1995 | Dietz |
| 5,477,850 A | 12/1995 | Zegler et al. |
| 5,503,646 A | 4/1996 | McKenny et al. |
| 5,517,930 A | 5/1996 | Farwick et al. |
| 5,521,132 A | 5/1996 | Talmy et al. |
| 5,527,365 A | 6/1996 | Coleman et al. |
| 5,534,127 A | 7/1996 | Sakai |
| 5,534,137 A | 7/1996 | Griggs et al. |
| 5,537,941 A | 7/1996 | Goidich |
| 5,543,061 A | 8/1996 | Baskis |
| 5,546,875 A | 8/1996 | Selle et al. |
| 5,547,549 A | 8/1996 | Fraas |
| 5,556,436 A | 9/1996 | Yagaki et al. |
| 5,562,884 A | 10/1996 | Oakes et al. |
| 5,568,896 A | 10/1996 | Adams et al. |
| 5,587,085 A | 12/1996 | Yoon et al. |
| 5,601,692 A | 2/1997 | Rinker et al. |
| 5,612,003 A | 3/1997 | Heumann |
| 5,625,119 A | 4/1997 | Tischler |
| 5,637,336 A | 6/1997 | Kannenberg et al. |
| 5,730,775 A * | 3/1998 | Meissner et al. ............ 75/436 |
| 5,830,246 A | 11/1998 | Dunlop |
| 5,830,247 A | 11/1998 | Dunlop |
| 5,832,848 A | 11/1998 | Reynoldson et al. |
| 5,858,035 A | 1/1999 | Dunlop |
| 5,904,741 A * | 5/1999 | Dunlop et al. ............ 44/626 |
| 6,068,671 A | 5/2000 | Iijima et al. |
| 6,146,432 A | 11/2000 | Ochs et al. |
| 6,162,265 A | 12/2000 | Dunlop et al. |
| 7,537,622 B2 | 5/2009 | Dunlop et al. |
| 7,695,535 B2 | 4/2010 | Dunlop |
| 7,893,307 B2 | 2/2011 | Smith |
| 8,062,410 B2 * | 11/2011 | Bullinger et al. ............ 95/288 |
| 8,203,024 B2 | 6/2012 | Leonhardt |
| 2003/0221363 A1 | 12/2003 | Reed |
| 2005/0188608 A1 * | 9/2005 | Dunlop et al. ............ 44/620 |
| 2008/0190015 A1 | 8/2008 | Davidsson |
| 2008/0223269 A1 | 9/2008 | Paoluccio |
| 2009/0007484 A1 | 1/2009 | Smith |
| 2009/0084029 A1 | 4/2009 | Bergman |
| 2009/0205546 A1 | 8/2009 | Kluko |
| 2009/0250331 A1 * | 10/2009 | Hopkins et al. ............ 201/6 |
| 2009/0272027 A1 | 11/2009 | Ruiters |
| 2010/0206499 A1 | 8/2010 | Lasonde et al. |
| 2010/0263269 A1 | 10/2010 | Dunlop et al. |
| 2010/0273899 A1 | 10/2010 | Winter |
| 2011/0252698 A1 | 10/2011 | Camper et al. |
| 2011/0314728 A1 | 12/2011 | Camper et al. |
| 2012/0272569 A1 | 11/2012 | Dunlop et al. |
| 2013/0055631 A1 | 3/2013 | Camper et al. |

FOREIGN PATENT DOCUMENTS

| | | |
|---|---|---|
| DE | 102005038135 | 3/2007 |
| GB | 2448531 A * | 10/2008 |

(56) References Cited

FOREIGN PATENT DOCUMENTS

| WO | WO8101713 A1 * | 6/1981 |
|---|---|---|
| WO | WO 2007/078199 | 7/2007 |
| WO | WO 2010/093310 | 8/2010 |

OTHER PUBLICATIONS

Bergman et al. "Torrefaction for biomass co-firing in existing coal-fired power stations," Biocoal, ECN-C-05-013, Jul. 2005, 71 pages.
Prins et al., "More efficient biomass gasification via torrefaction," Energy, 2006, vol. 31, pp. 3458-3470.
International Search Report for International (PCT) Application No. PCT/US10/49957, mailed Nov. 17, 2010.
Written Opinion for International (PCT) Application No. PCT/US10/49957, mailed Nov. 17, 2010.
Official Action and Search Report for European Application No. 11003257.0, mailed on Feb. 2, 2012, 8 pages.
Official Action for U.S. Appl. No. 12/566,174, mailed Oct. 27, 2011, 13 pages.
Notice of Allowance for U.S. Appl. No. 12/566,174, mailed Mar. 8, 2012, 7 pages.
Kaliyan, et al., "Densification characteristics of corn cobs," Department of Bioproducts and Biosystems Engineering, University of Minnesota, date unknown, 31 pages.
Kaliyan, et al., "Natural binders and solid bridge type binding mechanisms in briquettes and pellets made from corn stover and switchgrass," Bioresource Technology, 2010, vol. 101, pp. 1082-1090.
Shaw, "Feedstock and Process Variables Influencing Biomass Densification," Master of Science Thesis, Department of Agricultural and Bioresource Engineering, University of Saskatchewan, 2008, 159 pages.
Stelte, et al., "Fuel pellets from biomass: The importance of the pelletizing pressure and its dependency on the processing conditions," Fuel -The Science and Technology of Fuel and Energy, 2011, vol. 90, Iss. 11, pp. 3285-3290.
"Torrefaction," Wikipedia, the free encyclopedia, Oct. 1, 2011, [retrieved on Dec. 18, 2012], 3 pages. Retrieved from: http://en.wikipedia.org/w/index.php?title=Torrefaction&oldid=453436887.
European Search Report for European Patent Application No. 12007517.1 dated Jan. 14, 2013, 8 pages.
Official Action for U.S. Appl. No. 12/763,355, mailed Dec. 26, 2012 11 pages.
Official Action for U.S. Appl. No. 12/763,355, mailed Sep. 6, 2012 9 pages.
Extended European Search Report for European Patent Application No. 10819441.6 dated Jul. 24, 2013, 11 pages.
Official Action for U.S. Appl. No. 12/822,863 mailed Jun. 7, 2013, 5 pages.
"A Survey of Biomass Gasification: Synopsis and Executive Summary," Solar Energy Research Institute, Jul. 1979, vol. 1, 38 pages.
"A Survey of Biomass Gasification: Current Technology and Research," Solar Energy Research Institute, Apr. 1980, vol. 3, 308 pages.
"Tech-info" BMA, May 2011, 12 pages.
AMOS Report on Biomass Drying Technology, National Renewable Energy Laboratory, Nov. 1998, 35 pages.
Milne et al. "Biomass Gasifier "Tars": Their Nature, Formation, and Conversion," National Renewable Energy Laboratory, Nov. 1998, 28 pages.
Shafizadeh, Introduction to Pyrolysis of Biomass, Journal of Analytical and Applied Pyrolysis, Apr. 1982, vol. 3, No. 4, pp. 283-305.
Official Action for U.S. Appl. No. 12/822,863 mailed Jun. 19, 2014, 14 pages.
Wilén et al., "Wood torrefaction—market prospects and integration with the forest and energy industry," VTT Technology 163, 2014, 61 pages.
Official Action for U.S. Appl. No. 12/822,863 mailed Nov. 20, 2013, 10 pages.

* cited by examiner

| PROXIMATE ANALYSIS METHOD: ASTM D-5142 | AS RECEIVED Wt% | MOISTURE FREE wt% | MAF BASIS wt% |
|---|---|---|---|
| MOISTURE | 35.4 | | |
| ASH | 1.61 | 2.5 | |
| VOLATILE MATTER | 48.73 | 75.44 | 77.37 |
| FIXED CARBON | 14.26 | 22.06 | 22.63 |
| TOTAL | 100 | 100 | 100 |

| ULTIMATE ANALYSIS METHOD: ASTM 5142/5373 | | | |
|---|---|---|---|
| MOISTURE | 35.4 | | |
| HYDROGEN | 3.55 | 5.49 | |
| CARBON | 32.71 | 50.64 | |
| MNITROGEN | 0.04 | 0.07 | |
| SULFUR | 0.12 | 0.19 | |
| OXYGEN | 26.57 | 41.11 | |
| ASH | 1.61 | 2.5 | |
| TOTAL | 100 | 100 | |

| HEATING VALUE, BTU/IB: METHOD:ASTM D5865 | 5,699 | 8,823 | 9,049 |
|---|---|---|---|

FIG.4

| PROXIMATE ANALYSIS METHOD: ASTM D-5142 | AS RECEIVED Wt% | MOISTURE FREE wt% | MAF BASIS wt% |
|---|---|---|---|
| MOISTURE | 1.71 | ***** | ***** |
| ASH | 0.48 | 0.49 | ***** |
| VOLATILE MATTER | 67.03 | 68.2 | 68.53 |
| FIXED CARBON | 30.78 | 31.31 | 31.47 |
| TOTAL | 100 | 100 | 100 |

| ULTIMATE ANALYSIS METHOD: ASTM 5142/5373 | | | |
|---|---|---|---|
| MOISTURE | 1.71 | | |
| HYDROGEN | 5.46 | 5.56 | |
| CARBON | 54.43 | 55.38 | |
| MNITROGEN | 0.03 | 0.03 | |
| SULFUR | 0.29 | 0.3 | |
| OXYGEN | 37.6 | 38.24 | |
| ASH | 0.48 | 0.49 | |
| TOTAL | 100 | 100 | |

| HEATING VALUE, BTU/LB: METHOD:ASTM D5865 | 8,967 | 9,123 | 9,168 |
|---|---|---|---|

FIG.5

METHOD OF DRYING BIOMASS

This application is a Continuation In Part of U.S. patent application Ser. No. 12/763,355, filed Apr. 20, 2010, the entire disclosure of which is incorporated by reference herein.

FIELD OF THE INVENTION

Embodiments of the present invention generally relate to thermal processing of biomass "torrefaction" so that it can be used instead of, or in addition to, coal for energy production. In one embodiment of the present invention, the biomass is "roasted" in the presence of oxygen wherein heat generated by the combustion of biomass and hot gases associated with biomass combustion provide the heat required to support the torrefaction process, all in a single reactor.

BACKGROUND OF THE INVENTION

Many states have adopted Renewable Portfolio Standards (RPS) that require electricity supply companies to increase energy production that is attributed to renewable energy sources. The federal government may soon implement a renewable electricity standard (RES) that would be similar to the "renewables obligation" imposed in the United Kingdom. These standards place an obligation on electricity supply companies to produce a specified fraction of their electricity from renewable energy sources, such as wind, solar, hydro-electric, geothermal, biofuels, and biomass.

"Biomass" refers to renewable organic materials such as wood, forestry waste, energy crops, municipal waste, plant materials, or agricultural waste. Biomass often contains about 10 to about 50 weight percent moisture. The trapped moisture cannot be used as fuel and increases costs associated with transportation of the biomass. Thus biomass is a low grade, high cost fuel that cannot compete economically with the fuel most commonly used to generate electricity—coal. Further, biomass has a low bulk density, is very hydrophilic, is seasonal, is variable, and has a limited shelf life.

"Torrefaction" refers to the processing of biomass at temperatures between about 200° C. to about 350° C. (400°-660° F.) at atmospheric pressure wherein water and light volatile organic chemicals associated with the raw biomass material (i.e., "feed stock") are vaporized. In addition, during the torrefaction process, molecules of biopolymers (cellulose, hemicelluloses and lignin) contained in the biomass decompose. After torrefaction, the biomass is a solid, dry, blackened material that is often referred to as "torrefied biomass" or "biocoal" that is easier to grind, which allows it to be used in coal burning power plants. Further, the torrefied biomass possesses a lower oxygen content, has a significantly reduced moisture content (less than about 3%), and has higher fixed carbon levels, which is directly proportional to heating value.

Fluid bed reactors are commonly used to carry out multiphase reactions. In this type of reactor, gas or liquid is passed through a granular solid material at high enough velocity to suspend the solid and cause it to behave as though it were a fluid. This process, known as "fluidization" imparts many important advantages to the reactor. As a result, the fluidized bed reactor is now used in many industrial applications, such as coal drying. Commonly coal drying is performed in an inert gas, i.e., oxygen-free environment. Drying coal in a non-oxidizing environment requires external heat sources to maintain the temperature of the reactor. However, coal has been dried in an oxidizing environment where the heat used to support the process is at least partially drawn from the burning coal. The temperature of the fluid bed reactor used to dry and otherwise process the coal is controlled by balancing the rate at which the coal is fed into the reactor against the amount of heat generated by the combustion process. Drying of coal increases the heating value of low rank coals, reduces the particle size of the feed stock, and partially decarboxylizes and desulfurizes the coal. After the coal is dried, it must be rehydrated to raise the moisture content up to about 5-9% to reduce its spontaneous combustion characteristics so that it is similar to native coal.

The table provided below illustrates the differences between raw coal and processed coal. One of skill in the art will appreciate that processed coal possesses a higher fixed carbon and heating values correspond to raw coal and the moisture content is drastically reduced.

|  | Raw Coal | Product 1 | Product 2 | Product 2 |
|---|---|---|---|---|
| Proximate Analysis: | | | | |
| Moisture | 20.16% | 8.00% | 8.00% | 8.00% |
| Ash | 8.16% | 7.93% | 8.69% | 8.67% |
| Volatile Matter | 31.70% | 35.33% | 34.90% | 35.05% |
| Fixed Carbon | 39.98% | 48.74% | 48.42% | 42.48% |
| Ultimate Analysis: | | | | |
| Moisture | 20.16% | 8.00% | 8.00% | 8.00% |
| Hydrogen | 2.87% | 3.32% | 3.19% | 3.14% |
| Carbon | 55.50% | 63.15% | 62.65% | 62.74% |
| Nitrogen | 0.75% | 0.99% | 1.12% | 0.81% |
| Sulfur | 0.77% | 0.52% | 0.54% | 0.48% |
| Oxygen | 11.79% | 16.09% | 15.82% | 16.16% |
| Ash | 8.16% | 7.93% | 8.69% | 8.67% |
| Heating Value, Btu/lb | 9,444 | 10,460 | 10,315 | 10,165 |

SUMMARY OF THE INVENTION

It is one aspect of the present invention to process biomass by torrefaction. More specifically, torrefying biomass is an efficient way to achieve the goal of producing a biomass material that can be handled and burned like coal. Thus one embodiment of the present invention is a torrefaction process that is suited for biomass that reduces the moisture content, increases the heating value (HHV), and improves grindability and handling characteristics of the biomass. Hydrophobicity, shelf life, energy density, and homogeneity are all also improved. In addition, mass recovery of 55-65% of the feed as salable product is achieved. Further, energy recovery in the range of about 80-85% of the feed energy content of product is provided where nearly all sulphur is removed. In the process of one embodiment of the present invention, about 70% of the chlorine in the feed is also removed. One advantage to the contemplated process and related systems is that the processed biomass can be used in existing coal burning power plants alone or in combination with coal. That is, little or no modifications are needed to existing power producing systems or processes, and generating capacity was not decreased (derated).

It is another aspect of the present invention to employ a fluid bed reactor to torrefy the biomass. In one embodiment, the fluid bed reactor uses a combination of air and gas drawn from the fluid bed exhaust, i.e., "offgas" as a primary heating and fluidizing gas. The rate of fluidizing gas introduction into the fluid bed reactor would be as required to produce a gas velocity within the fluid bed reactor between about 4 and 8 feet per second. At this velocity, the bed temperature of the reactor would be maintained between about 230 to 350° C. (450 to 670° F.).

It is another aspect of the present invention to employ non fluidized bed reactors such as rotating drums, rotary kilns, cascaded whirling bed dryers, elongated slot dryers, hopper dryers, traveling bed dryers, vibrating fluidized bed dryers, vibrating screens, screw-based reactors and alike to torrefy the biomass. In such embodiments, the reactor uses a combination of air and gas drawn from the reactor exhaust, i.e., "offgas" as a primary heating and carrier gas for materials removed from the feed during torrefaction. The temperature of the reactor is maintained between about 230 and 350° C. (450 to 670° F.).

It is still yet another aspect of the present invention to torrefy biomass in the presence of oxygen. More specifically, as those skilled in the art are aware, torrefaction processes of biomass and coal, have generally been performed in an inert environment, usually in the presence of nitrogen, argon, water vapor, or some other inert or reducing gas. Those of skill in the art are also familiar with the fact that the rate at which volatiles associated with the feed stock are converted to vapor is a function of the amount of volatile organic and inorganic chemicals, processing temperature, and the residence time at the processing temperature. In general, reaction rates for volatile evolution, thermal cracking of larger organic compounds, and oxidation of the biomass increase with the increasing temperatures and increased residence time. However, because it takes time to dry the material before torrefaction reactions can occur, if the biomass is predried, preferably using heat from other sources in the system, residence times can be reduced.

Torrefying in an oxygen rich environment adds to the conversion of solid mass to gaseous mass and generates energy to drive the torrefaction process. The combustion of vaporized volatiles driven from the biomass generates heat to help maintain the torrefaction process. Traditionally, the heat associated with torrefaction predominately originates from outside sources. In contrast, the system of one embodiment of the present invention employs a fluid bed reactor that is heated internally by the burning of vapors from biomass and biomass itself. This reduces the amount of energy required from outside sources and allows the biomass to be "roasted" economically and in a controlled manner.

The primary reason that torrefaction processes of the prior art are performed in an inert environment is that burning of the biomass is believed to be uncontrollable and could lead to an explosion. Embodiments of the present invention, however, control the heat generation in the reactor to prevent excess combustion rates and possible explosion. Temperature control is achieved by controlling the amount of biomass feed and the amount of available oxygen to the reactor and one embodiment of the invention, combustion rate within the reactor is also controlled by selectively adding water to the reactor.

It is another aspect of the present invention to provide a torrefaction process that includes densifying the torrefied biomass into briquettes or pellets. In a related aspect, some embodiments of the present invention use alternate forms of biomass, such as switch grass, agricultural waste, or sawdust, that are not suitable for processing in a fluid bed reactor. That is, normally unsuitable cellulosic biomass is first sized and shaped into a predetermined form to allow processing by the reactor. One method of performing this resizing is achieved by using an Andritz-Sprout pellet mill.

It is another aspect of the present invention to provide a torrefaction process that employs a rotary drum reactor. In one embodiment, the biomass flows countercurrent to the flow of reaction gas, e.g. recycled gas and air. The gas directed to the reactor must be sufficient to maintain the necessary oxygen level and so that volatile combustion rate proceeds at a rate to produce sufficient heat to torrefy the biomass without becoming uncontrolled.

It is another aspect to provide a scalable system. As traditional systems depend primarily on external heat sources, increase in reactor size translates to reduced external surface area to volume ratios, thereby requiring increased heat transfer rates or reduced capacity. As one skilled in the art will appreciate, in the case of a large reactor, external heating sources cannot efficiently raise the temperature of the inner portions of the larger reactors to heat the biomass efficiently. The reactors of embodiments of the present invention, however, can be increased in size because the heat needed for torrefaction is internally generated. Ideally, a large reactor having an increased diameter is desired because it provides a bed with a large surface area to evenly expose the biomass to the heat.

It is still yet another aspect of the present invention to provide a process where pre-drying is used. As briefly mentioned above, biomass is often wet having a moisture content of about 10-50%. Thus to decrease residence time within the fluid bed reactor that is associated with vaporizing such moisture, some embodiments of the present invention pre-dry the feed stock. Pre-drying can be achieved by simply allowing the biomass to dry under ambient conditions. More preferably, however, a controlled pre-drying process is used wherein excess heat from the fluid bed reactor, or other processing stations of the system, is used to pre-dry the biomass.

It is still yet another aspect of the present invention to provide a process for starting combustion in the fluid bed reactor. More specifically, one embodiment of the present invention uses excess heat to initially start combustion of a predetermined amount of biomass positioned within the fluid bed reactor. After combustion has begun, the heat within the fluid bed reactor will increase due to the combustion of the biomass product. Once the temperature in the fluid bed reactor reaches a predetermined level, the amount of external heat added to the fluid bed reactor can be decreased and additional biomass is added to the reactor to maintain the temperature of the fluid bed reactor.

It is another aspect of the present invention to provide a new processing environment where torrefaction is performed at about 290° C. (550° F.) and wherein the biomass has a 15-20 minute residence time. One embodiment of the present invention has a minimum auto reaction temperature of about 260° C. (500° F.) and produces off gases of about 10 to 17 volume percent water vapor and about 4 to 5 volume percent carbon dioxide. The pressure in the fluid bed reactor is near atmospheric.

It is yet another aspect of the present invention to employ water sprays and a mixing device, such as a mixing screw or rotary drum, to cool the processed biomass. Hot torrefied product would be discharged directly from the reactor into the cooler and water would be sprayed onto the hot product through the use of a multiplicity of sprays to provide cooling through evaporation of water. The total amount of water added would be that to provide cooling to approximately the boiling point of water (100° C. at sea level) without raising the moisture content of the cooled product above approximately 3 weight percent. The mixing/tumbling action of the cooler would provide particle to particle contact to enhance distribution of the water added for cooling. The direct application of water may be achieved by methods disclosed in U.S. patent application Ser. No. 12/566,174, which is incorporated by reference in its entirety herein.

In an alternative embodiment of the present invention, an indirect cooler to reduce the temperature of the torrified biomass is employed in the event that a minimum moisture content is required. For example, an indirect cooler with cooling surfaces such as a hollow flight screw cooler or a rotary tube cooler may be employed to achieve this goal.

It is another aspect of the present invention to provide a single stage process for biomass torrefaction, comprising charging biomass to a fluidized bed reactor, charging air to the fluidized bed reactor at a velocity of from about 4 to about 8 feet per second, subjecting the biomass to a temperature of from about 230 and 350° C. (450 to 670° F.), and removing the water from the biomass by torrefying the biomass. The biomass charged to the fluidized bed reactor of this embodiment has an average moisture content from about 10 to about 50 percent. The reactor of this example may be comprised of a fluidized bed with a fluidized bed density up to about 50 pounds per cubic foot. In one contemplated process wood chips having a density of about 10 to 13 pounds per cubic foot are used. At fluidization, the bed density would be no more than half of the density of the feed stock. The biomass, such as agricultural waste, straw-like energy crops, etc., may be pelletized before feeding into the reactor. Pelletized feed would have bulk density of about 40 pounds per cubic foot so its bed density would be about 20 pounds per cubic foot.

It is another aspect of the present invention to provided a process for biomass torrefaction, comprising: adding biomass to a reactor; adding enriched gas to said reactor; controlling the oxygen content of the enriched gas; initiating heating of said biomass by increasing the temperature of said reactor; heating said biomass; maintaining said biomass within said reactor for a predetermined time; removing water from said biomass; vaporizing volatile organic compounds associated with said biomass; torrefying said biomass; and combusting said volatile organic compounds to help maintain the temperature of said fluidized bed reactor.

It is still yet another aspect of the present invention to provide a process for drying a material, comprising: directing the material to a reactor; pre-drying the material with gasses exhausted from the fluidized bed reactor; and subjecting said material within the reactor to a temperature sufficient to evaporate water; and combusting the vaporized organic compounds to provide heat needed to help maintain said temperature.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 4 is a table showing wood biomass data; and

FIG. 5 is a table showing bio-coal data.

Figure 1:
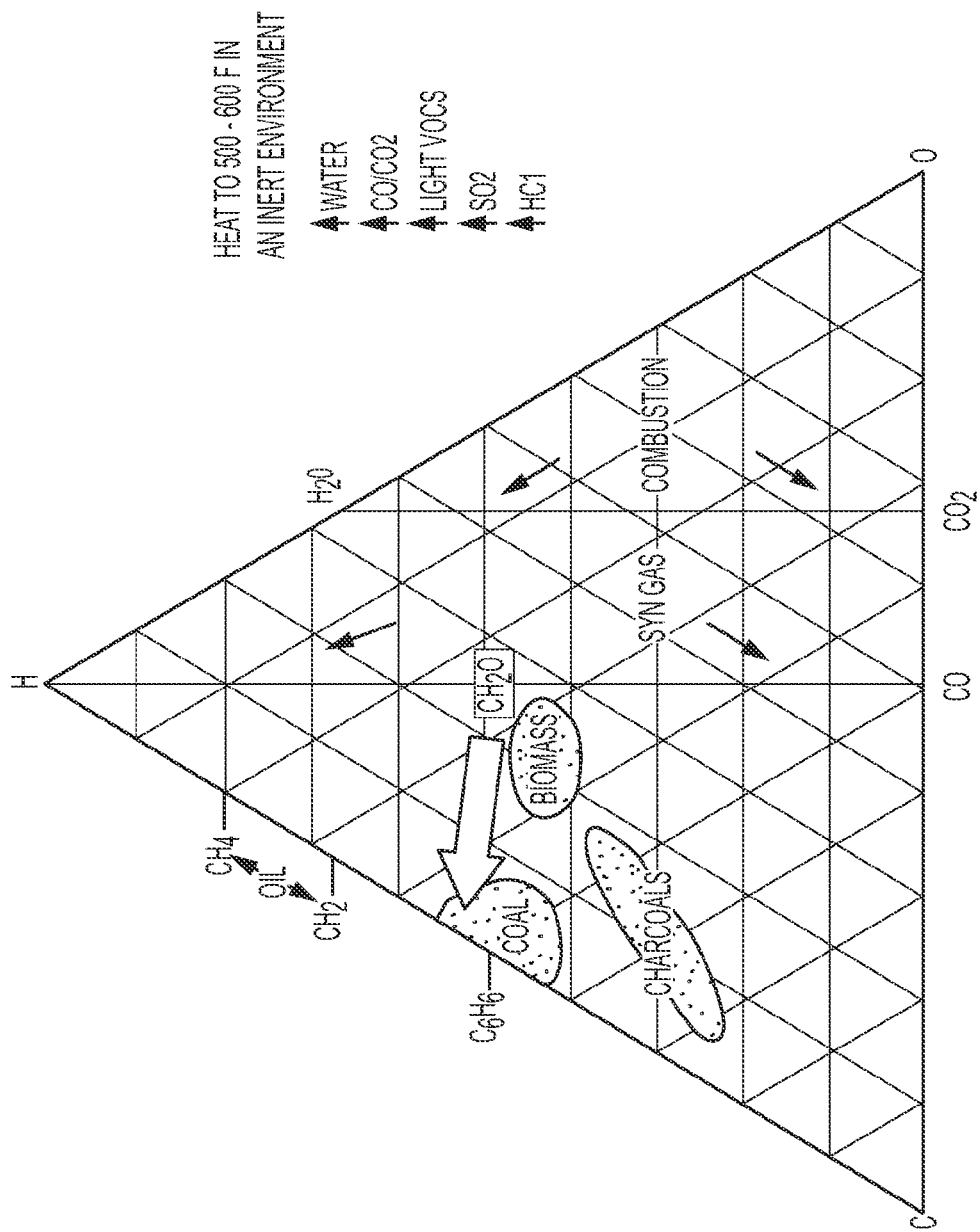
FIG. 1 is a schematic representation showing the relationship between biomass, coal, and charcoal torrefaction.

To assist in the understanding of one embodiment of the present invention, the following list of components and associated numbering found in the drawings is provided below:

| # | Component |
|---|---|
| 2 | Biomass torrefaction system |
| 6 | Fluid bed reactor |
| 10 | Hopper |
| 14 | Conveyor |
| 18 | Surge bin |
| 22 | Feeder |
| 26 | Feed screw |
| 34 | Plate |
| 46 | Off gas |
| 50 | Startup heater combustion air fan |
| 54 | Recycle fan |
| 58 | Recycle Gas line |
| 62 | Recycle Gas line |
| 66 | Recycle Gas line |
| 70 | Heated Fluidizing Gas line |
| 74 | Heated Fluidizing Gas line |
| 78 | Heated Fluidizing Gas line |
| 82 | Offgas line |
| 86 | Recycled Gas line |
| 90 | Recycled Gas line |
| 94 | Fresh air fan |
| 98 | Valve |
| 102 | Emissions control device |
| 106 | Particulate removable device |
| 110 | Startup heating system |
| 114 | Valve |
| 118 | Cooler |
| 122 | Dump valve |
| 126 | Conveyor |
| 130 | Storage system |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIG. 1 is a schematic representation showing the relationship between biomass, coal, and charcoal. It is one goal of embodiments of the present invention to provide a system and process suited for altering biomass, regardless of its source, such that it behaves like coal. One advantage of providing biomass that behaves like coal is that existing coal burning electrical power plants can use the processed biomass without substantial modifications. To make biomass a viable alternative, moisture content must be reduced, heating value must be increased, grindability and handling must be improved, hydrophobicity must be imparted, shelf life must be increased, energy density must be increased, and homogeneity must be improved. To achieve these objectives, embodiments of the present invention treat biomass by torrefaction wherein water, carbon dioxide, carbon monoxide, light volatile organic chemicals, sulphur dioxides, and hydrochlorides are driven out of the raw biomass. The end result is a coal like product that can be used in coal burning electricity generation plants of current design.

More specifically, the torrefaction contemplated by embodiments of the present invention include thermally processing biomass at temperatures of about 250-325° C. (480-620° F.) under near atmospheric pressure and in the presence of oxygen. This process will remove water and light volatiles from biomass and will reduce the oxygen content of the biomass. Importantly, the amount of fixed carbon in the biomass is increased and the biopolymers, cellulose, hemicelluloses, and lignin, are decomposed.

Figure 2:
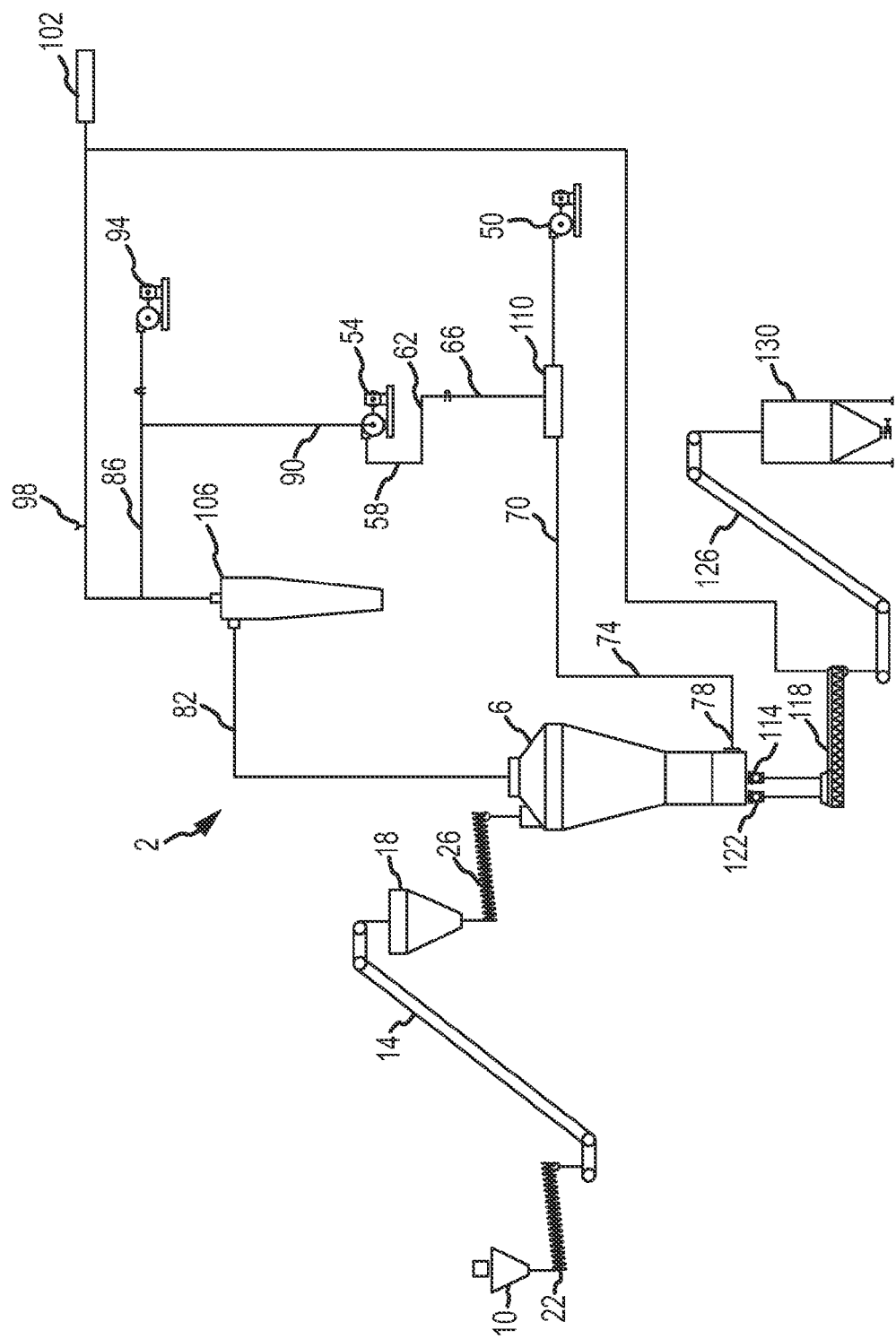
FIG. 2 is a schematic of a biomass torrefaction process of one embodiment of the present invention.

Referring now to FIG. 2, the biomass torrefaction system 2 of one embodiment of the present invention employs a fluidized bed reactor 6. The biomass may be wood that has been reduced in size by a commercially available wood chipper. The biomass may also be pelletized to increase its size, shape, and/or bulk density. The size of the biomass will vary, but the smallest dimension is typically about 3 mm to 10 mm. Although wood is mentioned here, one of skill in the art will appreciate that straw or other agricultural waste may be used without departing from the scope of the invention. In one embodiment, biomass having about 10 to 50 weight percent moisture is processed. The biomass is initially fed into a hopper 10 that in one embodiment is a feed hopper equipped with a screw conveyor or paddle screw feeder that is adapted to controllably feed biomass to a feed conveyor 14. In another embodiment, the biomass is fed directly into a surge bin 18.

A feeder 22 positioned beneath the feed hopper 10 empties biomass onto the conveyor 14. In one embodiment, the feed conveyor 14 provides up to 6000 pounds (2721.6 kg) of biomass per hour to the surge bin 18. The surge bin 18 is equipped with a controllable feed screw 26 that supplies the desired amount of feed at the desired rate to the fluid bed reactor 6. In another embodiment, a rotary valve or lock hoppers may be used if the surge bin is located above the reactor 6. In one embodiment, the surge bin 18 employs low level and high level sensors that automatically control a rotary valve and/or associated feeder 22 located underneath the feed hopper 10 in order to maintain a predetermined amount of feed biomass in the surge bin 18. In another embodiment, the level of biomass in the surge bin 18 is controlled using a continuous level sensor such as, e.g., an ultrasonic level sensing unit. A feed screw 26 directs biomass to the fluid bed reactor 6. The fluid bed reactor 6 may be a custom design or a commercially available design.

The biomass is dried to a moisture content of less than about 40 weight percent before introduction to the reactor 6. The biomass may be pre-dried by conventional means including, e.g., air drying, rotary kilns, cascaded whirling bed dryers, elongated slot dryers, hopper dryers, traveling bed dryers, vibrating fluidized bed dryers, and other methods that do not employ a fluidized bed reactor. Those of skill in the art will appreciate that fluidized-bed dryers or reactors may also be used. The heat source for pre-drying the biomass may be of the form of waste heat, other available heat sources, or auxiliary fuels. The waste heat may be drawn from the reactor 6 or an emissions control device 102. In one embodiment, the biomass is pre-dried to a moisture content of about 5 to about 20 weight percent. In another embodiment, two or more biomass materials, each with different moisture contents, are blended together to provide a raw feed with an average moisture content of less than about 40 weight percent that may also have been pelletized before processing.

Figure 3:
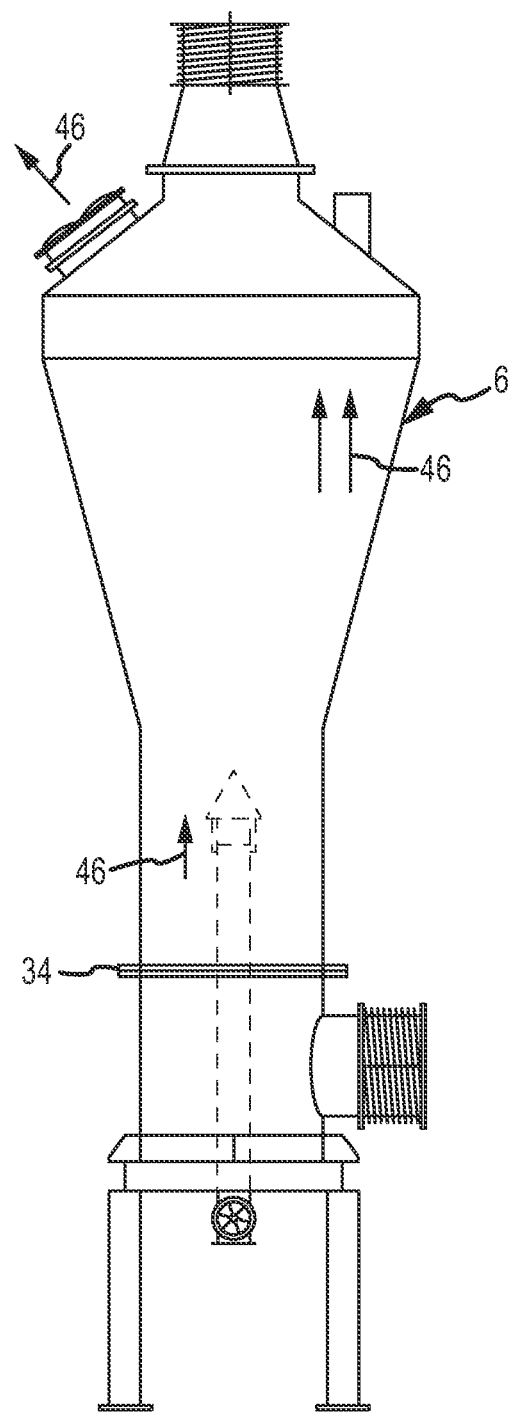
FIG. 3 is a detailed view of FIG. 2 showing a fluid bed reactor used in the process of one embodiment of the present invention.

FIG. 3 is a schematic of an integrated fluid bed reactor 6 and pre-dryer system of one embodiment of the invention. Off-gases 46 from the fluidized bed 6 contact and pre-dry the feed material before it reaches a plate 34. The fluidized bed reactor 6 is cylindrical and has an aspect ratio (bed height divided by diameter) of about 2 or less, in one embodiment, the aspect ratio ranges from about 2 to about ⅓. The bed is positioned within the cylindrical fluidized bed reactor at a depth of from about 1 to about 8 feet and, more preferably, from about 2 to about 5 feet. Non-cylindrical fluidized beds also may be used, but in one embodiment, the aspect ratio thereof (the ratio of the bed height to the maximum cross sectional dimension) ranges from about 2 to about ⅓. Bed fluidization is achieved by directing fluidizing gas through the perforated plate 34. A mixture of fresh air and recycled gas, i.e., gas taken from the fluidized bed reactor 6, is used as the fluidizing gas. It is preferred to use a blower to control the amount and composition of the fluidizing gas. In other embodiments, multiple blowers may be used.

A startup heater system 110 is used to provide the heat needed for preheating the fluidizing gas during startup for flame stabilization during normal operation. In addition, a recycle fan 54 is used to move the fluidized gas in a loop comprised of lines 58, 62, 66, 70, 74, 78, 82, 86 and 90 during startup and shutdown of the system.

A fresh air fan 94 is used to add fresh air to the fluidizing gas in order to adjust the oxygen content thereof. In another embodiment, the fan 94 may be replaced with a control valve and a suitable control valve added to line 86. During startup and shutdown, as fresh air is added to the fluidizing gas, a vent valve 98 is used to release an equal amount of gas to the emissions control device 102 to maintain a consistent flow of fluidizing gas through the reactor 6.

Gases exiting the reactor 6 enter a particulate removal device 106 where fines are separated. Multiple fines removal devices may be employed to allow coarser particulate to be recovered as additional product or as a separate product. Cleaned gas passes a vent valve 98 where an appropriate amount of gas is vented to an emissions control device 102. The purpose of the emissions control device 102 is to destroy any carbonaceous components in the offgas after removal of particulate. The emissions control device could be, e.g., a thermal oxidizer. Alternatively, the emissions control device could be, e.g., a catalytic oxidizer. Extra fuel may be added to the venting gas to raise the temperature thereof. The heated gas is then fed to a turbine to generate electricity to be used by the plant or for sale.

In one embodiment, a typical startup procedure involves, e.g., starting the heater system 110 and the recycle fan 54. Recycle fan speed is selected to ensure sufficient gas flow to achieve bed fluidization, preferably the apparent gas velocity in the reactor is in the range of about 4 to 8 feet per second. The temperature of the fluidizing gas is slowly increased using the heater system. When the biomass in the reactor 6 reaches a temperature within the range of about 446 to 482° F. (230 to 250° C.), biomass is fed to the reactor to fill the reactor bed. When the biomass reaches a temperature of approximately 250° C. (480° F.), it begins to release heat as it consumes oxygen present in the fluidizing gas. Small amounts of biomass are then added to the reactor 6 to maintain a steady rise in the temperature of the fluidized bed. It is preferred that the temperature of the fluidized bed be maintained at about 230 and 350° C. (450 to 670° F.) and, more preferably, about 270 to about 300° C. (520 to about 570° F.).

As biomass is processed it exits reactor 6 through valve 114 into a cooler 118. A dump valve 122 can be used to remove material buildup in the bed, or in case of emergency, be actuated to quickly empty the reactor 6 contents into the cooler 118. As the process reaches steady state, the temperature of the recycle gas in line 66 increases and the burner system 110 controls automatically reduces the firing rate. In one embodiment, hot gasses taken from the emissions control device 106 are used to preheat the fluidizing gas (for example, by the process of FIG. 3) to reduce the amount of combustion of biomass required to maintain the temperature of the fluidized bed as well as the amount of fuel required by the burner system 110. The reactor 6 is preferably equipped with several water spray nozzles (not shown) to assist in the control the temperature of the fluidized bed. The reactor 6 is also preferably equipped with several temperature sensors to monitor the temperature of the fluidized bed.

At steady state, reactor 6 operation is a balance between biomass particle size, the reactor temperature, the residence time required for decomposition of biomass polymers, the residence time required for moisture and volatile organics to diffuse from the interior of the biomass particles, the reaction rate of oxygen with the volatile organics, and the gas velocity required for maintaining proper levels of fluidization. In one embodiment, the smallest biomass particle dimension is from about 3 mm to about 10 mm, the fluidizing gas velocity is from about 4 to about 8 feet per second, the temperature of the fluidized bed is maintained at about 230 and 350° C. (450 to 670° F.) and, more preferably, at about 270 to about 300 degrees ° C. (520 to about 570° F.), and the average biomass particle residence time is from about 5 minutes to about 30 minutes.

The gases leaving the reactor 6 via line 82 have an oxygen content of less than about 8 volume percent, whereas the oxygen content of the fluidizing gas is maintained at greater than about 10 volume percent (and, more preferably, closer to that of fresh air) to maximize the rate of biomass processing. At the preferred steady state conditions, the amount of heat released via the combustion of the biomass is balanced by the amount of heat required to accomplish torrefaction and dry the biomass added to the reactor 6.

The off gas from reactor 6 is run through a particle separation step to remove particles entrained in the reactor offgas. In one embodiment, this step consists of a single unit such as bag house (not shown) or a cyclone 106. In another embodiment, the particle separation step includes multiple devices to facilitate recovery of entrained particles on the basis of particle size or density. Larger particles may be directed to the cooler for recovery as product.

The biomass produced in reactor 6 is typically at a temperature of about 275 to about 330 degrees Centigrade, and it typically contains about 0 to about 1 weight percent of moisture. This product is discharged through valve 114 which may be, e.g., a rotary valve, lock hoppers, etc. to a cooling apparatus 118.

The preferred method for cooling, rehydration, and stabilization occurs in one process piece of process equipment. This could be a screw conveyor, a mixing screw conveyor, a rotary drum, rotary tube cooler or any other device that would provide cooling through the application of water as well as mixing. The cooler 118 would be equipped with a multiplicity of water sprays and temperature sensors to allow water to be applied to the product for either progressively lowering the temperature of the product to less than the ambient boiling point of water (100 degrees Centigrade at sea level) and/or adding up to about 3 percent moisture to the product. The application of water may be continuous or intermittent. The control of water application could be on the basis of temperature, the mass flow rate of product and/or a combination thereof.

In one embodiment, the cooling device would be a mixing screw. In another embodiment, the cooling device could be a hollow flight screw cooler. The screw cooler assembly is also comprised of a multiplicity of water sprays and temperature sensors to control the application of water on the basis of product temperature. For example, if the rate of temperature decrease in the cooler is too low, and/or too high, the rate may be modified by modifying the biomass feed rate into the system, and/or by modifying flow rate or temperature of the water in the screw jackets and/or the rate at which water is applied using the sprays. The water spray may be continuous, and/or it may be intermittent.

The cooled biomass from cooler 118 is discharged 70 to a conveyor 126. The conveyor 126 conveys the cooled biomass product to a storage system 130, a load out system for trucks or railcars (not shown), or directly to the end user. Any gases emitted in the cooler are directed to the emissions control device 106.

Referring now to FIG. 4 shows a Proximate and Ultimate analysis for an example woody biomass feed. FIG. 5 shows a Proximate and Ultimate analysis for the torrefied product produced from the woody biomass feed of FIG. 4.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A process for biomass torrefaction, comprising:
adding biomass to a reactor;
adding a first gas to said reactor, wherein the first gas comprises an oxygen concentration from about 10 vol % to about 21 vol %;
controlling an oxygen concentration of a second gas exiting said reactor, wherein said oxygen concentration of the second gas is less than about 8 vol %;
initiating heating of said biomass by increasing a temperature of said reactor;
heating said biomass to a biomass temperature between about 250° C. to about 325° C. by partial combustion of said biomass with oxygen in the first gas in said reactor; and
maintaining the biomass temperature within said reactor for a predetermined time by spraying water into said reactor, whereby
a portion of moisture is removed from said biomass,
volatile organic compounds associated with said biomass are removed,
and said biomass is torrefied to produce a torrefied biomass with a moisture content from about 0 wt % to about 2 wt %.

2. The process of claim 1, wherein said biomass is not primarily heated by external sources after said initiating step.

3. The process of claim 1, wherein said biomass has an average moisture content of from about 10% to about 50% and said reactor is not fluidized.

4. The process of claim 1, wherein a pressure within said reactor is near ambient.

5. The process of claim 1, further comprising chipping said biomass to a maximum size of about 1.5 in.×1.5 in.×0.4 in. before said biomass is heated.

6. The process of claim 1, further comprising pelletizing the torrefied biomass to a maximum size of about 1.5 in.×1.5 in.×0.4 in.

7. The process of claim 1, wherein said initiating step entails raising the temperature of said reactor by a startup procedure comprising:

providing a starting heater;
slowly increasing heat within said reactor with said starting heater;
feeding said biomass to said reactor when the temperature of said reactor is between about 275° C. to 315° C.;
releasing heat by combustion of said biomass; and
adding small amounts of said torrefied biomass to said reactor to maintain a steady rise in temperature.

8. The process of claim 1, wherein said biomass added to said reactor has a minimum dimension of between 3 mm to 10 mm.

9. The process of claim 1, wherein said biomass comprises at least one of wood, plant material, and agricultural waste.

10. The process of claim 1, wherein said predetermined time is between about 5 to 30 minutes.

11. The process of claim 1, further comprising heating the first gas added to said reactor before feeding the first gas to said reactor using heat from the second gas exiting said reactor.

12. The process of claim 1, further comprising cooling the torrefied biomass with a cooler that includes at least one of a mixing screw conveyor, hollow flight screw conveyor, a rotary drum, and a rotary tube.

13. The process of claim 1, wherein substantially all sulfur is removed from said biomass.

14. The process of claim 1, wherein at least about 70% of chlorine found in said biomass is removed.

15. The process of claim 1, wherein the temperature of said reactor is controlled by a feed rate of said biomass and said spraying of water directly into said reactor.

16. The process of claim 1, wherein the temperature of said reactor is controlled by the oxygen concentration of the first gas added to said reactor.

17. The process of claim 1, wherein said reactor is a fluidized bed reactor.

18. The process of claim 1, wherein said biomass has an average moisture content of from about 10% to about 50% and said reactor is comprised of a fluidized bed with a fluidized bed density of from about 5 to about 30 pounds per cubic foot.

19. The process of claim 17, wherein the first gas is added to said fluidized bed reactor at a velocity from about 4 to about 8 feet per second.

20. The process of claim 19, wherein the first gas added to said fluidized bed reactor is sufficient to produce the torrefied biomass, such that the torrefied biomass has less than about 10 wt % moisture and possesses at least about 80% of the energy content of said biomass added to said fluidized reactor.

21. The process of claim 1, further comprising:
feeding the torrefied biomass into a cooler where the torrefied biomass is cooled to a temperature near 100° C. by adding no more than about 3 wt. % moisture to the dried biomass.

22. The process of claim 21, wherein said cooler comprises at least one water spray and at least one temperature sensor to allow water to be selectively applied to the torrefied biomass.

23. The process of claim 22 wherein the at least one water spray is intermittent.

24. The process of claim 17, wherein said fluidized bed reactor has an aspect ratio is no greater than about 2.

25. The process of claim 1, wherein said biomass and coal are added to said reactor.

26. The process of claim 1, wherein said biomass is selected from the group consisting of wood, forestry waste, energy crops, municipal waste, plant materials, agricultural waste, and combinations thereof.

27. The process of claim 17, wherein said fluidized bed is maintained at a fluidized bed density of from about 20 to about 50 pounds per cubic foot.

28. The process of claim 1, wherein said biomass has a residence time in said reactor of 2 to 5 minutes.

29. The process of claim 17, wherein said fluidized bed reactor has an aspect ratio is no greater than about 2.

30. The process of claim 1, further comprising modifying a feed rate of said biomass to selectively control the temperature of said reactor.

31. The process of claim 21, wherein said cooler comprises:
at least one water spray to allow water to be applied to the torrefied biomass for at least one of progressively lowering the temperature of said torrefied biomass to less than about 100° C. and adding up to 3 wt. % moisture to said torrefied biomass; and
at least one temperature sensor.

32. A single stage process for biomass torrefaction, comprising:
charging biomass to a fluidized bed reactor, said biomass selected from the group consisting of wood, forestry waste, energy crops, municipal waste, plant material, straw, agricultural waste, and combinations thereof;
charging a fluidizing gas to said fluidized bed reactor at a velocity of from about 4 to about 8 feet per second;
combusting an amount of said biomass in said fluidized bed reactor;
spraying liquid water into said fluidized bed reactor to assist with control of a temperature of said fluidized bed reactor from about 230° C. to about 350° C.;
maintaining an oxygen content of less than about 15 vol. % in an exiting gas leaving said fluidized bed reactor;
removing moisture from said biomass, wherein said biomass charged to said fluidized bed reactor has an average moisture content of from about 10% to about 50%, and wherein said fluidized bed reactor is comprised of a fluidized bed with a fluidized bed density of from about 20 to about 50 pounds per cubic foot, whereby a torrefied biomass is produced.

33. The process of claim 32, wherein said biomass charged to said fluidized bed reactor has a minimum dimension of 3 mm to 10 mm.

34. The process of claim 32, wherein said biomass charged to said fluidized bed reactor is wood, plant material, straw, or agricultural waste.

35. The process of claim 32, wherein said fluidized bed is maintained at a fluidized bed density of from about 20 to about 50 pounds per cubic foot.

36. The process of claim 32, wherein said biomass has a residence time in said fluidized bed reactor of 2 to 5 minutes.

37. The process of claim 32, further comprising heating said fluidizing gas to form a heated fluidizing gas before feeding said heated fluidizing gas into said fluidized bed reactor using heat recovered from said heated fluidizing gas taken from said fluidized bed reactor.

38. The process of claim 32, further comprising a cooler that employs at least one of a mixing screw conveyor, hollow flight screw conveyor, a rotary drum and a rotary tube.

39. The process of claim 32, wherein the liquid water is sprayed into said fluidized bed reactor continuously.

40. The process of claim 32, wherein the liquid water is sprayed into said fluidized bed reactor intermittently.

41. The process of claim 32, wherein an amount of heat released by the combustion of said biomass is balanced by an amount of heat required to accomplish drying of said biomass and torrefaction of said biomass added to said fluidized bed reactor.

42. The process of claim 32, further comprising modifying a feed rate of said biomass to selectively control the temperature of said fluidized bed reactor.

43. The process of claim 32, further comprising:
feeding said torrefied biomass into a cooler and cooling said torrefied biomass to a temperature near 100° C. and adding no more than 3 wt. % moisture to the torrefied biomass.

44. The process of claim 43, wherein said cooler comprises:
at least one water spray to allow water to be applied to the torrified biomass for at least one of progressively lowering the temperature of said torrified biomass to less than about 100° C. and adding up to 3 wt. % moisture to said torrefied biomass; and
at least one temperature sensor.

45. The process of claim 44 wherein the water is applied continuously.

46. The process of claim 44 wherein the water is applied intermittently.

47. The process of claim 32, wherein said biomass and coal are directed to the fluidized bed reactor.

* * * * *